US012583523B2

(12) United States Patent
Lanzerath

(10) Patent No.: US 12,583,523 B2
(45) Date of Patent: Mar. 24, 2026

(54) MECHANICAL COMPONENT FOR MOTOR VEHICLE WITH ENERGY ABSORPTION CAPABILITY

(71) Applicant: Ford Global Technologies, LLC, Dearborn, MI (US)

(72) Inventor: Horst Heribert Lanzerath, Bad Muenstereifel (DE)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 18/300,759

(22) Filed: Apr. 14, 2023

(65) Prior Publication Data

US 2023/0331309 A1     Oct. 19, 2023

(30) Foreign Application Priority Data

Apr. 15, 2022    (DE) .......................... 102022109388.3

(51) Int. Cl.
  *B62D 21/15*      (2006.01)
  *B62D 25/02*      (2006.01)
  *B62D 29/00*      (2006.01)
(52) U.S. Cl.
  CPC ......... *B62D 21/157* (2013.01); *B62D 25/025* (2013.01); *B62D 29/008* (2013.01)
(58) Field of Classification Search
  CPC ............................ B62D 21/157; B62D 25/025
(Continued)

(56) References Cited

U.S. PATENT DOCUMENTS

| | | | | |
|---|---|---|---|---|
| 10,308,286 | B2 * | 6/2019 | Yang .................... | B62D 21/157 |
| 2014/0265443 | A1 * | 9/2014 | Meaige ................ | B62D 25/025 |
| | | | | 296/187.02 |

(Continued)

FOREIGN PATENT DOCUMENTS

| | | |
|---|---|---|
| DE | 4113711 | 11/1992 |
| DE | 102011116626 | 4/2013 |

(Continued)

OTHER PUBLICATIONS

DE 102017006057A1 and English translation; Rausch; Dec. 27, 2018 (Year: 2025).*

(Continued)

*Primary Examiner* — Roger L Pang
(74) *Attorney, Agent, or Firm* — Burris Law, PLLC

(57) ABSTRACT

The sill assembly for a motor vehicle includes a hollow support, a mechanical component, and holding elements. The hollow support extends along a longitudinal direction of the motor vehicle and defines a cavity. The mechanical component is disposed within the cavity of the hollow support. The mechanical component includes at least one reinforcing structure extending parallel to the longitudinal direction of the motor vehicle and including a strip-shaped profile having a width that extends transverse within the cavity. The holding elements are disposed within the cavity of the hollow support and secured to the mechanical component to position the mechanical component within the cavity. Each holding element has at least one form-fitting element having a shape corresponding to a form-fitting element of the hollow support to reduce the potential for rotational movement of the mechanical component relative to the hollow support. The holding elements are detached from the hollow support.

20 Claims, 6 Drawing Sheets

(58) Field of Classification Search
   USPC ............................ 296/209, 187.312, 203.03
   See application file for complete search history.

(56) References Cited

U.S. PATENT DOCUMENTS

| | | | | |
|---|---|---|---|---|
| 2018/0304932 | A1* | 10/2018 | Cooper ................ | B62D 29/043 |
| 2020/0140018 | A1 | 5/2020 | Grottke et al. | |
| 2021/0039718 | A1* | 2/2021 | Koga ..................... | B62D 21/15 |
| 2023/0202564 | A1* | 6/2023 | Bodin .................. | B62D 21/157 |
| | | | | 296/205 |

FOREIGN PATENT DOCUMENTS

| | | |
|---|---|---|
| DE | 102012222182 | 6/2014 |
| DE | 102018218851 | 10/2019 |
| JP | H07117728 | 5/1995 |
| JP | 2020104601 | 7/2020 |
| WO | 2013061514 | 5/2013 |

OTHER PUBLICATIONS

Search Report issued in corresponding DE Application 102022109388.
3, issued Nov. 22, 2022, with Google translation, 10 pages.

\* cited by examiner

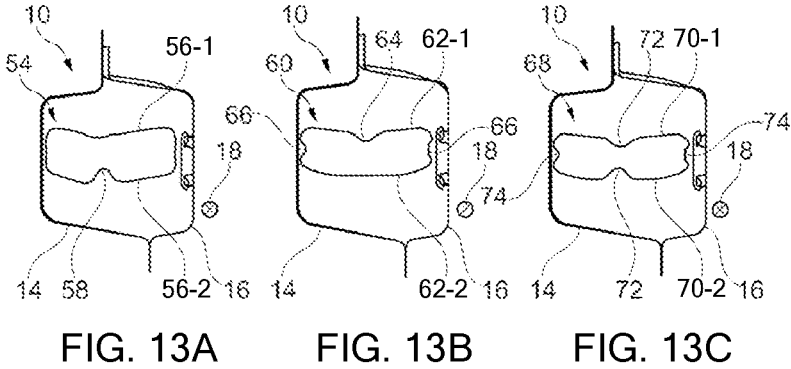
FIG. 13A          FIG. 13B          FIG. 13C
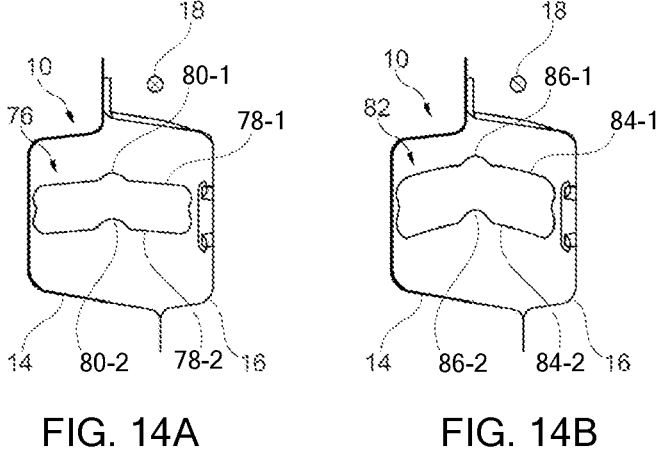
FIG. 14A                    FIG. 14B

MECHANICAL COMPONENT FOR MOTOR VEHICLE WITH ENERGY ABSORPTION CAPABILITY

CROSS-REFERENCE TO RELATED APPLICATION

This application claims priority to and the benefit of German Patent Application No. 102022109388.3, filed on Apr. 15, 2022. The disclosure of the above application is incorporated herein by reference.

FIELD

The present disclosure relates to a component in particular a sill arrangement of a motor vehicle having a hollow support within which at least one mechanical reinforcing device is arranged with at least one reinforcing structure.

BACKGROUND

The statements in this section merely provide background information related to the present disclosure and may not constitute prior art.

The use of energy-absorbing elements which are provided to convert kinetic energy in the event of a certain type of impact event into deformation work in order to manage energy on a passenger compartment or vehicle occupants in certain situations is known in the field of automotive engineering. In particular, cylindrical hollow bodies can be used here.

For example, DE 102012222182 A1 ("DE '182") proposes a tubular energy absorber of a motor vehicle. The energy absorber of DE '182 is an energy absorber composed of a composite material, and has a profile which has at least one curved section and at least one straight section, and at least one curved section is at least partially curved inwardly. Thus, a compromise between high energy absorption in the longitudinal direction and high resistance to lateral bending forces can be achieved. The profile can have a basic shape of a cross, for example a Greek cross, which has four outer side sections. At least two opposing side sections of the cross can be curved.

The energy absorber can be composed of at least two separately produced, open longitudinal parts which are adhesively bonded to one another to obtain the closed energy absorber.

In the case of certain lateral impact events, it may be desirable to maintain the integrity of the passenger compartment of a motor vehicle as substantially as possible. Particular attention is paid here to the sill region of motor vehicles and the energy absorption of the sill region in the case of a lateral impact event.

For example, U.S. Pub. No. 2020/0140018 A1 describes a sill of a vehicle body. The sill comprises at least one first sill profile and one second sill profile. The sill profiles extend in the longitudinal direction of the sill and each have a connecting surface facing the further sill profile. The connecting surfaces run vertically at least in regions. The at least two sill profiles are adhesively bonded to one another via at least one region of the connecting surfaces of the sill profiles. At least one latching protrusion is integrally formed on at least one of the sill profiles, adjacent to the connecting surface, and engages in at least one latching receptacle of another of the sill profiles.

The strength of the second sill profile can be tuned to an appropriate level independently from the strength of the first sill profile. In the assembled state of the vehicle, the second sill profile is the outwardly directed, outer sill profile, and the first sill profile is the inner sill profile facing the vehicle center. Owing to the different strengths, firstly, the second sill profile of lower strength can serve as a deformation zone in the event of a certain type of impact. The impact energy is converted into deformation energy and thus absorbed in the outer sill profile. Secondly, the first or inner sill profile, can be tuned to an appropriate strength to reduce the potential of buckling of the sill or piercing of the sill by an object, for example a post or pole.

The difference in the strength can be set by the material and/or the shape of the sill profiles. The sill profiles can be multi-chamber profiles. The sill profiles can be aluminum profiles and preferably extrusion profiles. In the case of a multi-chamber profile, the individual chambers within the profile are separated from one another by partitions. The strength of the first and second sill profiles can be set in a specific way by means of the number, orientation and shape of the chambers and therefore of the partitions.

Solutions for sill structures which have reinforcing structures or reinforcing devices with which an amount of potentially absorbable energy in the event of a lateral impact event can be increased have been proposed in the prior art.

JP 2020-104601 A provides a sill structure of a vehicle body, which is capable of controlling a deformation mode of a sill in the event of a side impact and of increasing an energy absorption amount which can be obtained by deformation of the sill.

A reinforcing plate is clamped by an upper end flange of a sill inner plate and an upper end flange of a sill outer plate and is connected to them. The reinforcing plate is also clamped by a lower end flange of the sill inner plate and a lower end flange of the sill outer plate and is connected to them. If a load is applied to the sill outer plate at the time of a side impact, a displacement in the vertical direction of the vehicle at a vertical connecting part between the sill outer plate and the remaining sill structure can be suppressed.

A plurality of reinforcing ribs which extend in a width direction of the vehicle and are arranged with an intermediate space between adjacent beads in a longitudinal direction of the vehicle are formed on an upper wall and a lower wall of the sill inner plate and on an upper wall and a lower wall of the sill outer plate. The depth of the reinforcing ribs is set in such a manner that it gradually increases towards the reinforcing plate.

If a load at the time of a side impact is exerted on the sill outer plate, the upper wall part and the lower wall part of the sill outer plate are bent and deformed one after the other from the end part side on the outer side in the direction of the vehicle width, and the upper wall part and the lower wall part of the sill outer plate are sequentially bent and deformed from the end part side on the inner side in the width direction of the vehicle. A wide region of the sill structure can therefore be used for energy absorption in certain side impacts.

The increased complexity in the design of a sill structure of this type requires improved production methods.

WO 2013/061514 A1 discloses a vehicle body side structure with improved production capability by permitting a partial installation of an end plate and improvement of the shock absorption properties by increasing the connection strength between elements which form the vehicle body side structure.

For sealing an opening on the vehicle body rear side of the vehicle body side structure with a closed cross section comprising a side sill inner element, a side sill outer part and a side sill reinforcing element which are connected to one another by means of weld connection flanges, an end plate is provided. The end plate is connected here to the side sill inner element and the side sill outer part by means of the rear edge of the side sill reinforcing element by welding. Furthermore, the end plate is fastened to the rear end of the side sill reinforcing element by means of a screw.

Furthermore, DE 4113711 A1 proposes a hollow support, in particular for use in motor vehicles. The hollow support is designed for converting energy when force is introduced in a direction approximately perpendicular to its extent and has at least one reinforcing wall in the direction of the introduction of force. The reinforcing wall is curved at least in sections in order to reduce the potential of the reinforcing wall deforming when subjected to a load. The curvatures are deformed in a predetermined manner into folds when the hollow support is deformed. The reinforcing wall can have oppositely directed curvatures. A plurality of reinforcing walls provided with curvatures can be arranged parallel to one another in the hollow support.

In view of the indicated prior art, the region of the sill arrangements with reinforcing elements or reinforcing devices for motor vehicles still leaves room for advancement.

SUMMARY

This section provides a general summary of the disclosure and is not a comprehensive disclosure of its full scope or all of its features.

The present disclosure provides a sill assembly for a motor vehicle that includes a hollow support, a mechanical component, and holding elements. The hollow support extends along a longitudinal direction of the motor vehicle and defines a cavity. The mechanical component is disposed within the cavity of the hollow support. The mechanical component includes at least one reinforcing structure extending parallel to the longitudinal direction of the motor vehicle and including a strip-shaped profile having a width that extends transverse within the cavity. The holding elements are disposed within the cavity of the hollow support and secured to the mechanical component to position the mechanical component within the cavity. Each holding element has at least one form-fitting element having a shape corresponding to a form-fitting element of the hollow support to reduce the potential for rotational movement of the mechanical component relative to the hollow support. The holding elements are detached from the hollow support.

It should be pointed out that the features and measures presented individually in the following description can be combined with one another in any technically meaningful way and give rise to further refinements of the disclosure.

The disclosure will be described by way of example below with reference to a component in the form of a sill arrangement. Within the meaning of the disclosure, the latter can also be used for other components of motor vehicles which may be exposed to a bending load, i.e., to a lateral impact event or to an impact event acting in the longitudinal direction of the motor vehicle. For example, pillar reinforcements, bumper cross beams or roof rails are conceivable here, to mention just a few examples of such components.

The component according to the present disclosure, i.e., the sill arrangement according to the disclosure of a motor vehicle, has a hollow support, the direction of extent of which can be arranged or is arranged parallel to a longitudinal direction of the motor vehicle. The hollow support forms a cavity within which at least one mechanical reinforcing device of the sill arrangement is arranged with at least one reinforcing structure which is oriented over a predominant part transversely with respect to the direction of extent and parallel to a direction of force which may occur in the case of certain lateral impact events and is provided to convert momentary present kinetic energy during a lateral impact event by its own deformation into deformation work. Each reinforcing structure has a predetermined self-overlapping area in the direction of force which may occur in certain lateral impact events. A momentary self-overlapping area in this direction above a predetermined threshold value for the force acting in this direction because of deformation of the reinforcing structure is a multiple of the predetermined self-overlapping area.

As used herein, a "predominant part" or "predominant portion" means a portion of more than 50%, preferably of more than 70% and, particularly preferably, of more than 90%. In some forms, a "predominant part" or "predominant portion means complete, i.e. is 100%. As used herein, the term "provided for" means specially designed or arranged for this purpose.

It is proposed that each mechanical reinforcing structure is in the form of a strip-shaped profile and the reinforcing device is arranged freely within the cavity at least by means of a respective holding element fastened to the reinforcing device within end regions with respect to the extent thereof. Each strip-shaped profile is oriented with its length parallel to the direction of extent and with a surface normal of its surface formed by length and width transversely with respect to a direction of force which may occur in certain lateral impact events. In addition, each of the holding elements has at least one form-fitting element which, in an installed state, in each case forms, together with a corresponding form-fitting element of the hollow support, a form-fitting connection which reduces the potential for a rotational movement of the reinforcing device about the direction of extent.

In a suitable refinement, kinetic energy can be converted in duplicate into deformation work by the proposed sill arrangement in the case of certain lateral impact events. Firstly, the self-overlapping area increases because of deformation of each reinforcing structure arranged freely within the cavity, for which deformation part of the kinetic energy is used. Secondly, the increase in the self-overlapping area brings about a rise in the bending resistance moment of the reinforcing structure for bending deformation about a vertical axis (the vertical axis of the motor vehicle) such that a higher amount of energy can be converted with the same bending deformation.

The increased bending resistance moment has the result that a locally limited deformation (e.g., buckling) of the reinforcing device can be managed, this being inefficient for converting the kinetic energy into deformation work. Instead, in the case of a lateral impact event, the reinforcing device can be used over its entire length in the direction of extent in a subsequent bending process about the vertical axis.

Furthermore, by reducing the potential for a rotational movement of the reinforcing device about the direction of extent in the case of a lateral impact event, the deformation of the reinforcing device, i.e., in particular of the single reinforcing structure or the plurality of reinforcing structures, is permitted reproducibly in a predefined way such that a specific directing of the force acting in certain impact events can be achieved for deformation of the reinforcing device, as a result of which the bending resistance moment of the reinforcing device can be particularly effectively increased.

In one form of the sill arrangement, at least one of the holding elements is in the form of a holding plate which is arranged transversely with respect to the direction of extent and is adapted to a cross-sectional area of the cavity. In this way, the reinforcing device can be arranged freely within the cavity in a structurally particularly simple manner and with minimal effect on its bending resistance moment. Furthermore, the at least one form-fitting element of the holding plate and the corresponding form-fitting element of the hollow support can be provided in a structurally simple manner.

In one form, a cross-sectional area of the cavity has a multiplicity of inner corners, of which at least one forms the corresponding form-fitting element of the hollow support, and the at least one form-fitting element of each of the holding elements is in the form of a corner element which, in the installed state, takes up at the inner corner a predetermined distance from the surface of the cavity. As a result, a multiplicity of form-fitting connections by which a rotational movement of the reinforcing device about the direction of extent is particularly effectively managed can be produced in a simple manner. As used herein, the term "multiplicity" means a number of at least two.

In another form of the sill arrangement, the at least one strip-shaped profile or the strip-shaped profiles of the mechanical reinforcing device in the installed state has or have a cross-sectional shape curved transversely with respect to the direction of extent. This refinement makes it possible for the force acting during the impact event above the predetermined threshold value to be used reproducibly for deformation of the reinforcing device, the deformation corresponding to folding of the strip-shaped profile or of the strip-shaped profiles and therefore approximately to a duplication of the material thickness of the strip-shaped profile or of the strip-shaped profiles, as a result of which the bending resistance moment of the reinforcing device can be particularly effectively increased.

In one form, the cross-sectional shape, curved transversely with respect to the direction of extent, of the at least one strip-shaped profile or of the strip-shaped profiles has, in the installed state, a uniform curvature with an identical sign and, in the case of a plurality of strip-shaped profiles, a dimension of each of the profiles perpendicular to the relevant surface is at least 10% of a dimension of the reinforcing device in this direction.

On the basis of a force acting in the case of certain impact events in the direction of force which may occur above the predetermined threshold value, this refinement can permit folding of the profile or of the profiles along a plane which is arranged perpendicular to the direction of force which may occur and in which the apex point of the curved cross-sectional shape of the profile or the apex points of the curved cross-sectional shapes of the profiles lies or lie. As a result, a duplication of the profile or of all of the profiles of the reinforcing device can be obtained reproducibly, which corresponds to a considerable increase in the bending resistance moment of the reinforcing device for bending about the vertical axis.

In another form of the sill arrangement, the at least one mechanical reinforcing device in the installed state has at least two strip-shaped profiles, which are arranged spaced apart from one another and parallel to one another in the vertical direction, as reinforcing structures which are connected to one another on their longitudinal sides by side elements such that an intermediate space is in each case formed between strip-shaped profiles which are adjacent in the vertical direction.

With at least one mechanical reinforcing device of this refinement, the force and direction of force which may occur in certain impact events above the predetermined threshold value by folding of the strip-shaped profiles makes it possible to achieve a particularly large bending resistance moment for subsequent bending of the reinforcing device about the vertical axis.

In such forms of the sill arrangement, at least one side element optionally has at least one bead which, in the installed state, is formed along a predominant part of a length of the strip-shaped profiles in the direction of extent. By means of the bead or the beads, particularly good reproducibility and stability of the process of increasing the self-overlapping area because of the folding of the profiles by the force acting in the case of an impact event above the threshold value can be permitted. The bead can be in the form of a groove or a rib, as viewed from outside the reinforcing device.

In another form of the sill arrangement, at least one strip-shaped profile has at least one bead which, in the installed state, is formed along a predominant part of a length of the strip-shaped profile in the direction of extent. In a similar way, as in the case of a side element, the bead or the beads can make possible particularly good reproducibility and stability of the process of increasing the self-overlapping area because of the folding of the flat profiles by the force acting in the case of an impact event above the threshold value.

In one form, both in the case of a side element and in the case of a strip-shaped profile, the at least one bead has a depth which, in the installed state, is at least 10% of an entire height dimension of the reinforcing device in the vertical direction. With such a refinement of the bead, particularly good reproducibility and stability of the process of folding the flat profiles by the force acting in the case of certain impact events above the threshold value and the increase in the self-overlapping area can be achieved.

In another embodiment of the sill arrangement, the profile or the profiles of the at least one mechanical reinforcing device has a predominant portion made of steel, aluminum or an aluminum alloy. However, suitable materials other than those mentioned by way of example can also be used within the meaning of the disclosure. In particular, steel with a martensite structure is particularly preferred. When steel is used, a sill arrangement according to the disclosure which can be produced particularly efficiently can be provided.

In this way, a sill arrangement for a motor vehicle can be provided, which sill arrangement, with a reduced weight, can potentially absorb a quantity of energy during certain lateral impact events by deformation which meets or exceeds the amount of energy of conventional sills.

In another form, the present disclosure discloses a sill assembly for a motor vehicle including a hollow support, at least one mechanical component and holding elements. The hollow support extends along a longitudinal direction of the motor vehicle and defines a cavity. The mechanical component is disposed within the cavity of the hollow support. The mechanical component includes a plurality of reinforcing structures and side elements connecting the reinforcing structures. The reinforcing structures extend parallel to the longitudinal direction of the motor vehicle and are spaced apart from each other in a vertical direction. Each reinforcing structure includes a strip-shaped profile having a width that extends transverse within the cavity. The holding elements are disposed within the cavity of the hollow support and are secured to the mechanical component to position the mechanical component within the cavity. Each holding element has at least one form-fitting element having a shape corresponding to a form-fitting element of the hollow support to reduce the potential for rotational movement of the mechanical component relative to the hollow support. The holding elements are detached from the hollow support.

In variations of the sill assembly of the above paragraph, which can be implemented individually or in any combination: the holding elements are in the form of holding plates arranged transversely with respect to the longitudinal direction of the motor vehicle; the hollow support includes an inner corner comprising the form-fitting element of the hollow support, and the at least one form-fitting element of each holding element is in the form of a corner element which is a predetermined distance from an inner surface defining the cavity; the strip-shaped profile of each reinforcing structure has a predominant portion made of steel, aluminum or an aluminum alloy; the strip-shaped profile of each reinforcing structure is arcuate in a transverse direction with respect to the longitudinal direction of the motor vehicle; the strip-shaped profile of each reinforcing structure is flat; and the flat strip-shaped profile of each reinforcing structure has at least one bead formed along a predominant part of a length thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 13A-13C are cross-sectional perspective views of sill arrangements including different reinforcing devices; and FIGS. 14A and 14B are cross-sectional perspective views of sill arrangements including different reinforcing devices.

Figure 1:
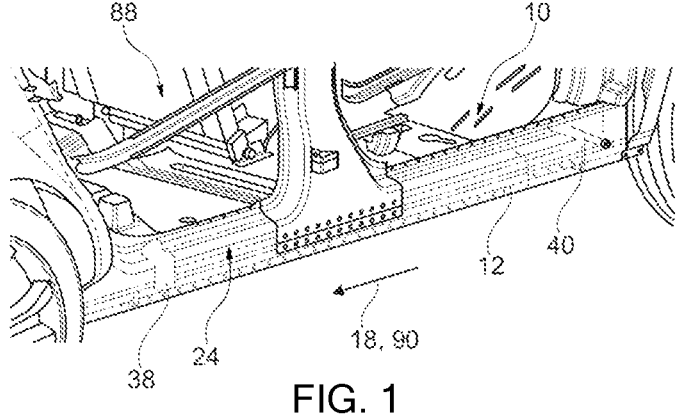
FIG. 1 is a perspective side view of a motor vehicle with a sill arrangement shown in phantom lines in an installed state according to the principles of the present disclosure.
Figure 2:
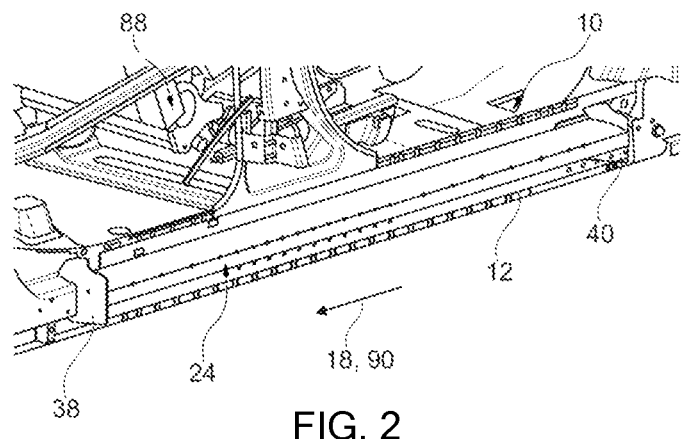
FIG. 2 is a perspective side view of the motor vehicle of FIG. 1 with the covering of the B pillar removed for clarity.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the various figures, identical parts are always provided with the same reference signs, and therefore they are generally also only described once.

FIG. 1 shows one form of a sill arrangement 10 according to the present disclosure of a motor vehicle 88 in an installed state. In the present disclosure, the motor vehicle 88 is in the form of a passenger vehicle.

The sill arrangement 10 is located between the wheel houses of the motor vehicle 88 below the door sills of the motor vehicle 88. A symmetrically identically constructed sill arrangement is arranged (not illustrated) on the other side of the motor vehicle 88.

Figure 5:
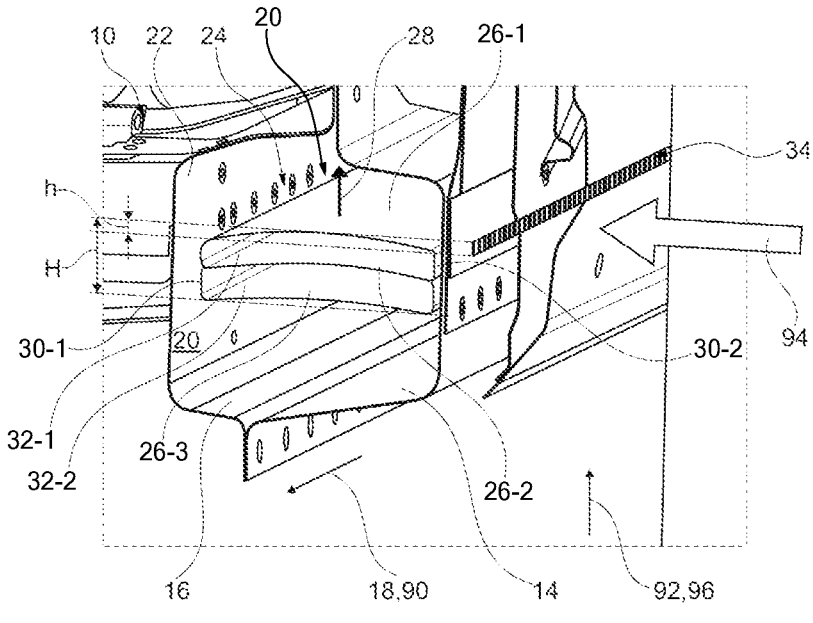
FIG. 5 is a perspective cross-sectional view of the sill arrangement of FIG. 1 in the installed state and directly before a lateral impact event.

With reference to FIGS. 1-5, the sill arrangement or assembly 10 has a hollow support 12, the direction of extent 18 of which is arranged and oriented parallel to a straight-ahead direction of travel 90 or longitudinal direction of the motor vehicle 88. In the example illustrated, the hollow support 12 includes a lower part of a sidewall 14 (FIG. 5) and a sill inner part 16 (FIG. 5) which are both hat-shaped and are fixedly connected to one another in a known manner by means of integrated flange elements on an upper side and a lower side of the hollow support 12, for example by spot-welding. The sill arrangement 10 can alternatively include a differently configured hollow support which has the features according to the disclosure. FIG. 5 shows a detail of the sill arrangement 10 in the installed state.

The hollow support 12 forms a cavity 20, the cross-sectional area of which has a multiplicity of inner corners 22 with rounded corner regions. For reasons of clarity, only one of the inner corners 22 is denoted in FIG. 5. The sill arrangement 10 furthermore includes a mechanical reinforcing device or component 24 which is arranged within the cavity 20. The reinforcing device 24 has reinforcing structures 26-1, 26-2, 26-3 which are provided to convert present kinetic energy in the case of a lateral impact event by their own deformation into deformation work.

The reinforcing structures 26-1, 26-2, 26-3 of the reinforcing device 24 are formed in the example illustrated by three strip-shaped profiles which each contain a predominant portion of steel. In particular, steel with a martensite structure can be used here. However, suitable materials other than those mentioned by way of example can also be used within the meaning of the disclosure.

Each of the strip-shaped profiles is oriented with its length parallel to the direction of extent 18 and with a surface normal 28 of its surface formed by length and width transversely with respect to a direction of force 94 which may occur in certain lateral impact events. Each of the strip-shaped profiles is therefore oriented over a predominant part transversely with respect to the direction of extent 18.

In the installed state, the three strip-shaped profiles are arranged spaced apart from one another and parallel to one another in the vertical direction 96. In the installed state, each of the strip-shaped profiles has a cross-sectional shape curved transversely with respect to the direction of extent 18. The curved cross-sectional shape of the three strip-shaped profiles has a uniform curvature with the same sign. A dimension h of each of the three profiles perpendicular to the surface concerned is at least 10% of a dimension H of the reinforcing device 24 in this direction, namely approximately 14% in the example illustrated.

In the installed state illustrated in FIG. 5, the three strip-shaped profiles are connected to one another on their longitudinal sides by side elements 30-1, 30-2 such that an intermediate space 32-1, 32-2 is in each case formed between profiles which are adjacent in the vertical direction 96. In the example illustrated, the two intermediate spaces 32-1, 32-2 have the same heights in the vertical direction 96. In other possible forms, the intermediate spaces 32-1, 32-2 can also have differing heights in the vertical direction 96.

In the installed state, which is shown in FIG. 5, each of the three reinforcing structures 26-1, 26-2, 26-3 has a predetermined self-overlapping area 34 in the direction of force 94 which may occur in certain lateral impact events before the impact event. The self-overlapping area 34 can be regarded as a projection area of a parallel projection of one of the reinforcing structures 26-1, 26-2, 26-3 from the direction of force 94 which may occur onto a plane arranged perpendicularly thereto.

Figure 3:
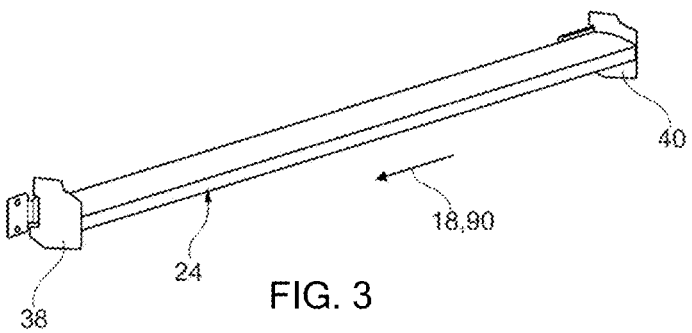
FIG. 3 is a perspective view of a mechanical reinforcing device of the sill arrangement of FIG. 1.
Figure 4:
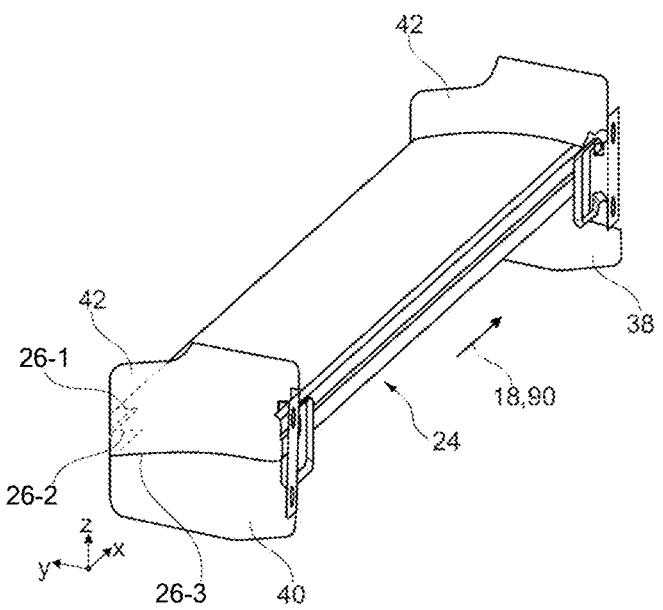
FIG. 4 is another perspective view of the mechanical reinforcing device of the sill arrangement of FIG. 1.

The sill arrangement 10 furthermore includes two holding elements 38, 40 by means of which the reinforcing device 24 is arranged freely within the cavity 20 (FIG. 3). For this purpose, in the example illustrated, each of the holding elements 38, 40 is fastened to the reinforcing device 24 within an end region with respect to the extent thereof. It should be noted that the holding elements 38, 40 are connected only to the reinforcing device 24, but not to the hollow support 12 (i.e., the holding elements 38, 40 are detached from the hollow support 12). In other forms, a greater number of holding elements can also be used for the free arrangement of the reinforcing device 24 within the cavity 20. For example, a further holding element can be fastened to the reinforcing device 24 in a central region with respect to the extent thereof.

Each of the holding elements 38, 40 is in the form of a holding plate which is arranged transversely with respect to the direction of extent 18 and is adapted to a cross-sectional area of the cavity 20 (FIGS. 2, 4 and 5) by each of the holding elements 38, 40 having rounded corner elements 42 (FIG. 4) which, in the installed state, take up a predetermined distance from the surface of the cavity 20 at the relevant inner corner 22 (FIG. 5). The rounded corner elements 42 are form-fitting elements of the holding elements 38, 40 and, in the installed state, in each case form, together with a corresponding form-fitting element of the hollow support 12, a form-fitting connection, wherein the corresponding form-fitting elements of the hollow support 12 are formed by the multiplicity of inner corners 22 with rounded corner regions, by which the cross-sectional area of the hollow support 12 is delimited. The form-fitting connections formed in this way can reduce the potential for a rotational movement of the reinforcing device 24 about the direction of extent 18 as axis.

Figure 6:
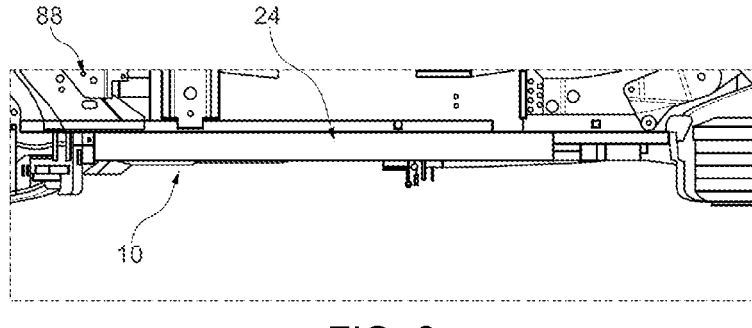
FIG. 6 is a top perspective view of the sill arrangement of FIG. 5.

FIG. 6 shows the reinforcing device 24 directly before a lateral impact event occurs having a direction of force 94 which may occur in certain lateral impact events. This situation is illustrated particularly in FIG. 6 in a top view of the sill arrangement 10.

Figures 7, 8, 9, 10:
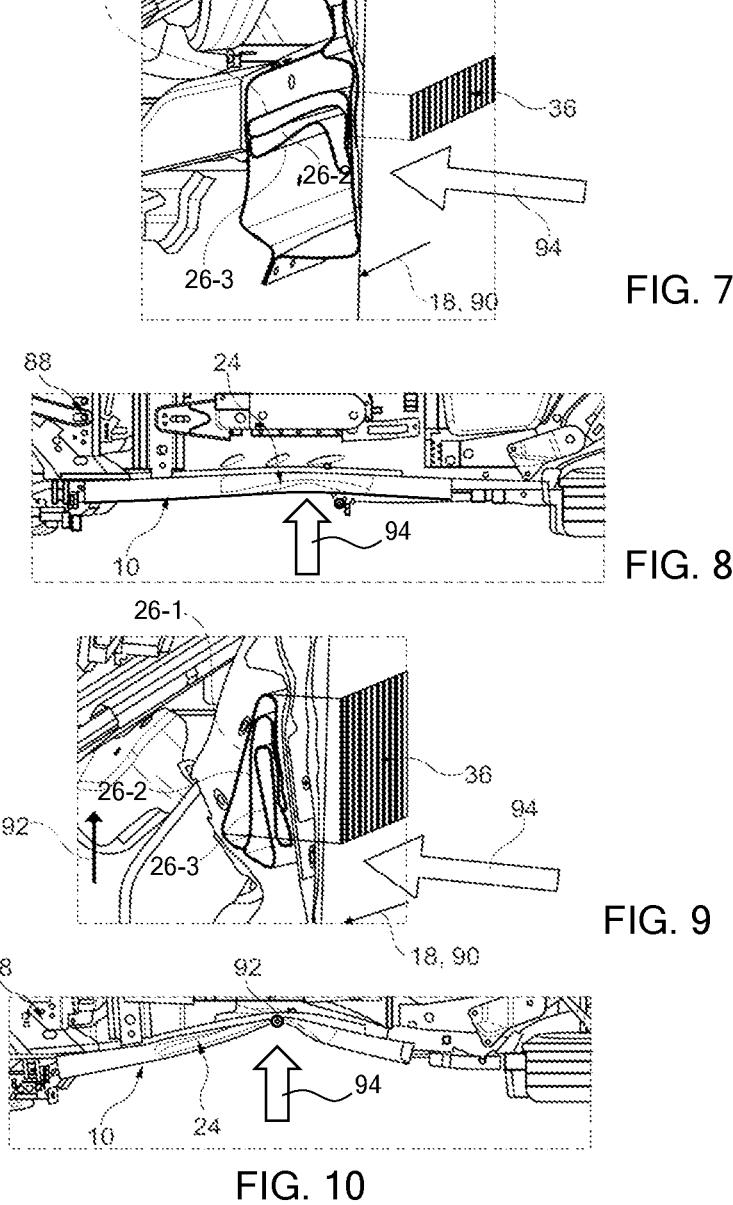
FIG. 7 is a perspective cross-sectional view of the sill arrangement of FIG. 1 in the installed state at a first time after the lateral impact event.
FIG. 8 is a top perspective view of the sill arrangement of FIG. 7.
FIG. 9 is a perspective cross-sectional view of the sill arrangement of FIG. 1 in the installed state at a second, later time after the lateral impact event.
FIG. 10 is a top perspective view of the sill arrangement of FIG. 9.

FIG. 8 is a top view of the sill arrangement 10 in the installed state at a first time after the lateral impact event has occurred. The force acting in the direction of force 94 because of the impact event has exceeded a predetermined threshold value for the force.

FIG. 7 shows that the momentary self-overlapping area 36, existing at this time, of the reinforcing structures 26-1, 26-2, 26-3 has greatly increased in the direction 94 of the force acting because of the impact event and is a multiple of the predetermined self-overlapping area 34. The increase in the momentary self-overlapping area 36 is based on the deformation of the reinforcing structures 26-1, 26-2, 26-3 in the form of a folding about an axis which is arranged parallel to the direction of extent 18.

FIG. 10 is a top view of the sill arrangement 10 in the installed state at a second, later time after the lateral impact event has occurred.

FIG. 9 shows that, at this second, later time, the momentary self-overlapping area 36 of the reinforcing structures 26-1, 26-2, 26-3 has furthermore increased in the direction 94 of the force acting because of the impact event. The deformation of the reinforcing structures 26-1, 26-2, 26-3 in the form of the folding has progressed to such an extent that, in the installed state, mutually opposite longitudinal regions of the reinforcing structures 26-1, 26-2, 26-3 enter into mutual contact directly or indirectly. As is immediately apparent in the case of an alternative form of a reinforcing device with a single reinforcing means, the mutual contact can be regarded as a duplication of the reinforcing structures 26-1, 26-2, 26-3. Owing to the duplication of the reinforcing structures 26-1, 26-2, 26-3, there is a considerable increase of the bending resistance moment of the reinforcing device 24 with respect to a bending about a vertical axis 92, arranged parallel to the vertical direction 96, of the motor vehicle 88.

It should be noted at this juncture that the deformation of the reinforcing structures 26-1, 26-2, 26-3 in the form of the folding has already converted some of the momentary kinetic energy into deformation work. It should furthermore be emphasized that reducing the potential for rotational movement of the reinforcing device 24 contributes decisively to a reproducible folding movement of the reinforcing structures 26-1, 26-2, 26-3 during the deformation by the force acting because of the impact event.

It is particularly apparent from FIG. 10 that, by duplicating the reinforcing structures 26-1, 26-2, 26-3, a locally limited buckling can be managed and, instead, the reinforcing structures 26-1, 26-2, 26-3 are involved along a larger region of the direction of extent 18 in a bending movement of the reinforcing device 24 about the vertical axis 92 of the motor vehicle 88. This leads to an increased conversion of momentary kinetic energy into deformation work, and therefore, despite the reinforcing structures 26-1, 26-2, 26-3 being of lightweight design, a high capacity for converting momentary kinetic energy into deformation work in the case of certain lateral impact events can be achieved.

FIGS. 11, 12, 13A-13C, 14A, and 14B illustrate alternative forms of the sill arrangement according to the present disclosure. To avoid repetitions, only the differences of the alternative forms are described below.

Figures 11, 12:
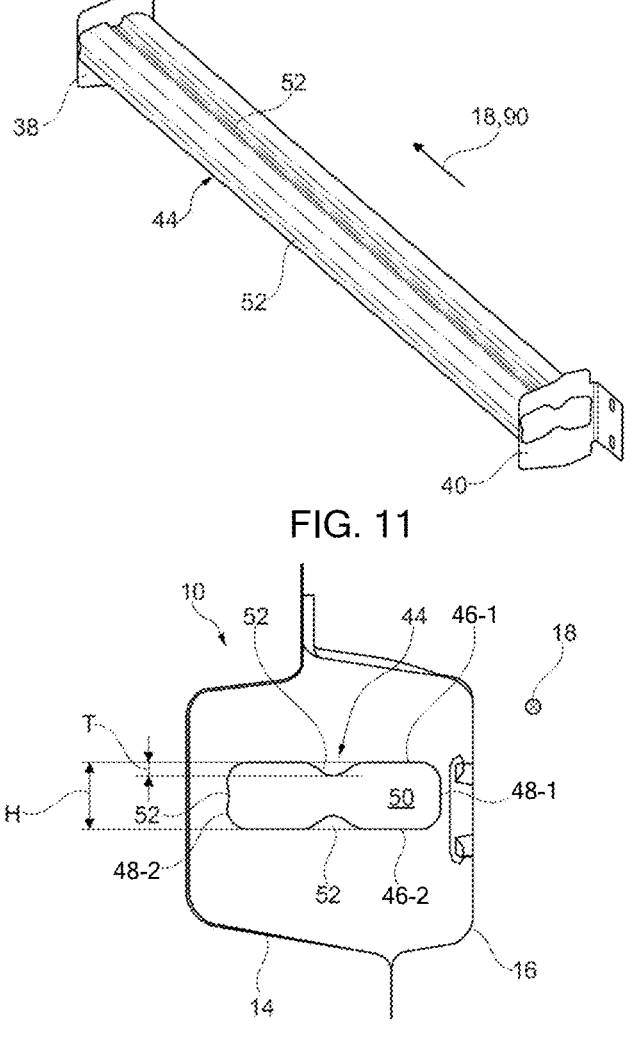
FIG. 11 is a perspective view of an alternative reinforcing device according to the principles of the present disclosure.
FIG. 12 is a cross-sectional perspective view of a sill arrangement including the reinforcing device of FIG. 11.

FIGS. 11 and 12 show a reinforcing device 44 having two reinforcing means 46-1, 46-2 (FIG. 12) which are designed as a strip-shaped flat profile similarly to the flat profiles in FIG. 5 above, but do not have a cross-sectional shape which is curved transversely with respect to the direction of extent 18, rather being provided with planar surfaces. The two reinforcing means 46-1, 46-2 are connected to one another on their longitudinal sides by side elements 48-1, 48-2 such that a single intermediate space 50 is formed between them in the vertical direction 96.

Each of the two flat profiles has a bead 52 which is in the form of a groove and which, in the installed state, is arranged along a predominant part of a length of the strip-shaped flat profile in the direction of extent 18 along a center line of the flat profile. Furthermore, one or both of the side elements 48-1, 48-2 likewise has a bead 52 in the form of a groove along a central line of the direction of extent 18.

The beads 52 formed in the side elements 48-1, 48-2 and the beads 52 formed in the flat profiles have a depth T which, in the installed state, is at least 10% of an entire height dimension H of the reinforcing device 44 in the vertical direction 96.

The beads 52 bring about particularly good reproducibility and stability of the process of increasing the self-overlapping area on account of the folding of the flat profiles by the force above the threshold value acting in the case of an impact event.

The alternative forms of the reinforcing device according to FIGS. 13A-13C each have two reinforcing structures 56-1, 56-2, 62-1, 62-2, 70-1, 70-2 which are in the form of a strip-shaped flat profile and have a cross-sectional shape which is curved transversely with respect to the direction of extent 18 and has an opposite sign in comparison to the curved cross-sectional shape of the flat profiles of FIG. 5.

In the form of the reinforcing device 54 of FIG. 13A, only the lower reinforcing structure 56-2, which is in the form of a strip-shaped flat profile, has a central bead 58, which is in the form of a groove. In the form of the reinforcing device 60 of FIG. 13B, the strip-shaped flat profile arranged uppermost reinforcing structure 62-1 and the side elements have a respective central bead 64 and 66 in the form of a groove. In the form of the reinforcing device 68 of FIG. 13C, the two strip-shaped flat profiles of reinforcing structures 70-1, 70-2 and the side elements have a respective central bead 72 and 74 in the form of a groove.

The alternative forms of the reinforcing device according to FIGS. 14A and 14B each have two reinforcing structures 78-1, 78-2, 84-1, 84-2 which are in the form of a strip-shaped flat profile with a cross-sectional shape curved transversely with respect to the direction of extent 18 similarly to the reinforcing structures 26-1, 26-2 above.

In the form of the reinforcing device 76 illustrated in FIG. 14A, the strip-shaped flat profile arranged uppermost reinforcing structure 78-1 has a bead 80-1 in the form of a central rib, and the strip-shaped flat profile arranged lowermost reinforcing structure 78-2 has a bead 80-2 in the form of a central groove.

In the form of the reinforcing device 82 illustrated in FIG. 14B, the strip-shaped flat profile arranged uppermost reinforcing structure 84-1 has a bead 86-1 in the form of a central rib, and the strip-shaped flat profile arranged lowermost reinforcing structure 84-2 has a bead 86-2 in the form of a central groove. This form of the reinforcing device 82 therefore corresponds to the form of the reinforcing device 76 illustrated in FIG. 14A except for a more pronounced curvature of the cross-sectional shape, which is curved transversely with respect to the direction of extent 18, of the strip-shaped flat profiles.

Roll forming, extrusion or any other production method appearing expedient to a person skilled in the art for producing the described shapes can be used as the method for producing the strip-shaped flat profiles and the reinforcing devices. The holding elements can be welded or mechanically connected or adhesively bonded or clamped or fastened by another joining method to the reinforcing device.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A sill assembly for a motor vehicle comprising:
   a hollow support extending along a longitudinal direction of the motor vehicle and defining a cavity;
   at least one mechanical component disposed within the cavity of the hollow support, the at least one mechanical component comprising at least one reinforcing structure extending parallel to the longitudinal direction of the motor vehicle and including a strip-shaped profile having a width that extends transverse within the cavity; and
   a plurality of holding elements disposed within the cavity of the hollow support and secured to the at least one mechanical component to position the at least one mechanical component within the cavity, each holding element has at least one form-fitting element having a shape corresponding to a form-fitting element of the hollow support to reduce the potential for rotational movement of the at least one mechanical component relative to the hollow support,
   wherein the plurality of holding elements are transverse plate structures spaced apart from each other along a length of the at least one mechanical component.

2. The sill assembly of claim 1, wherein the holding elements are in the form of holding plates arranged transversely with respect to the longitudinal direction of the motor vehicle.

3. The sill assembly of claim 1, wherein the hollow support includes an inner corner comprising the at least one form-fitting element of the hollow support, and the at least one form-fitting element of each holding element is in the form of a corner element which is a predetermined distance from an inner surface defining the cavity.

4. The sill assembly of claim 1, wherein the strip-shaped profile of the at least one reinforcing structure is arcuate in a transverse direction with respect to the longitudinal direction of the motor vehicle.

5. The sill assembly of claim 1, wherein the strip-shaped profile of the at least one reinforcing structure has a uniform curvature.

6. The sill assembly of claim 1, wherein the at least one mechanical component has at least two strip-shaped profiles, which are arranged spaced apart from each other and are parallel to each other, and wherein the at least two strip-shaped profiles are connected to each other by side elements such that an intermediate space is formed between the at least two strip-shaped profiles.

7. The sill assembly of claim 6, wherein at least one side element of the side elements has at least one bead formed along a predominant part of a length thereof.

8. The sill assembly of claim 1, wherein the strip-shaped profile has at least one bead formed along a predominant part of a length thereof.

9. The sill assembly of claim 1, wherein the strip shaped profile is flat.

10. The sill assembly of claim 8, wherein the at least one bead has a depth that is at least 10% of an entire height of the at least one mechanical component.

11. The sill assembly of claim 1, wherein the strip-shaped profile has a predominant portion made of steel, aluminum or an aluminum alloy.

12. The sill assembly of claim 1, wherein the hollow support includes a first part and a second part secured to each other to define the cavity.

13. The sill assembly of claim 1, wherein a first holding element of the plurality of holding elements is secured to a first end of the at least one mechanical component and a second holding element of the plurality of holding elements is secured to a second end of the at least one mechanical component.

14. A sill assembly for a motor vehicle comprising:
a hollow support extending along a longitudinal direction of the motor vehicle and defining a cavity;
at least one mechanical component disposed within the cavity of the hollow support, the at least one mechanical component comprising a plurality of reinforcing structures and side elements connecting the reinforcing structures, the reinforcing structures extending parallel to the longitudinal direction of the motor vehicle and spaced apart from each other in a vertical direction, each reinforcing structure includes a strip-shaped profile having a width that extends transverse within the cavity; and
a plurality of holding elements disposed within the cavity of the hollow support and secured to the at least one mechanical component to position the at least one mechanical component within the cavity, each holding element has at least one form-fitting element having a shape corresponding to a form-fitting element of the hollow support to reduce the potential for rotational movement of the at least one mechanical component relative to the hollow support,
wherein the plurality of holding elements are transverse plate structures spaced apart from each other along a length of the at least one mechanical component.

15. The sill assembly of claim 14, wherein the holding elements are in the form of holding plates arranged transversely with respect to the longitudinal direction of the motor vehicle.

16. The sill assembly of claim 14, wherein the hollow support includes an inner corner comprising the form-fitting element of the hollow support, and the at least one form-fitting element of each holding element is in the form of a corner element which is a predetermined distance from an inner surface defining the cavity.

17. The sill assembly of claim 14, wherein the strip-shaped profile of each reinforcing structure has a predominant portion made of steel, aluminum or an aluminum alloy.

18. The sill assembly of claim 14, wherein the strip-shaped profile of each reinforcing structure is arcuate in a transverse direction with respect to the longitudinal direction of the motor vehicle.

19. The sill assembly of claim 14, wherein the strip-shaped profile of each reinforcing structure is flat.

20. The sill assembly of claim 14, wherein the strip-shaped profile of each reinforcing structure has at least one bead formed along a predominant part of a length thereof.

* * * * *